Patented Aug. 5, 1941

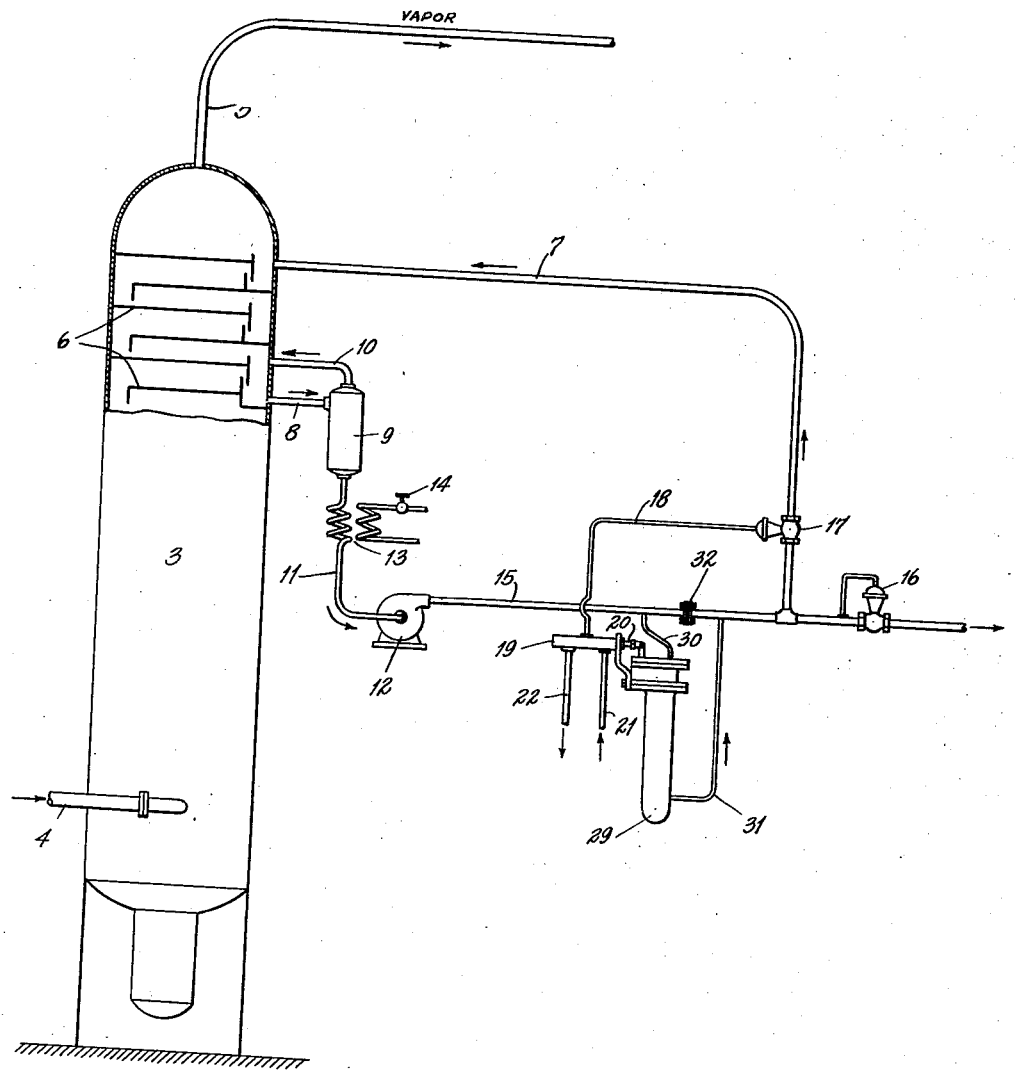

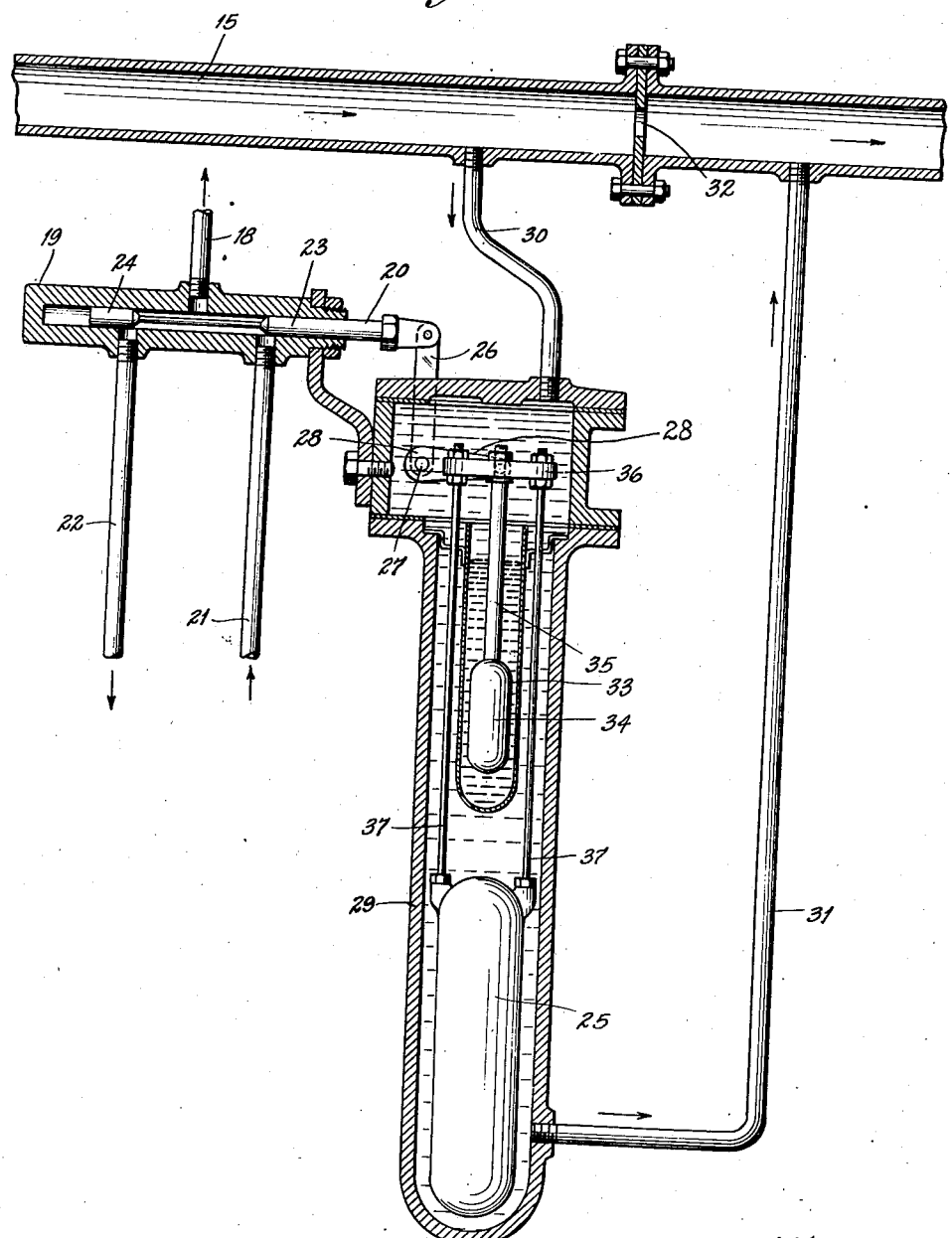

2,251,771

UNITED STATES PATENT OFFICE 2,251,771

METHOD OF AND APPARATUS FOR SELECTING FRACTIONS FROM FRACTIONATING CONDENSERS

Glenn E. Wynn and Robert G. Huggins, Tulsa, Okla., assignors to Mid-Continent Petroleum Corporation, Tulsa, Okla., a corporation of Delaware Application June 17, 1939, Serial No. 279,628

15 Claims. (Cl. 202—40)

This invention relates to methods of and apparatus for selecting fractions from fractionating condensers, the object being to overcome the uncertainty and inaccuracy heretofore involved in obtaining a condensed product having a predetermined gravity.

Prior to this invention, fractionating condensers, or reflux condensers, have been rather extensively employed to condense and discharge various different products, and the cooling in such condensers has been regulated as an aid in selecting the desired products. This is especially true of the petroleum industry, wherein products having different boiling points are condensed and removed from different cooling zones in the fractionating condensers. In commercial practice, automatic regulating devices are commonly employed to control the condensing temperatures, thereby providing for the selection and removal of fractions which are condensed at a predetermined temperature.

However, a selection of this kind, depending upon a predetermined condensing temperature, does not result in the recovery of a product having predetermined properties. Even if we assume that a constant temperature is accurately maintained in a given condensing zone, the condensate removed from that zone will vary in accordance with varying conditions which inevitably occur in actual practice. For example, the gage pressure in the condenser is subject to more or less frequent variations, and this will obviously result in variations in the product condensed at a predetermined constant temperature. Other variations in the condensed product are due to variations in the character of the charging material, variations in the charging rates and changes in the partial pressures of the vapors, all of which are beyond the control of a device which merely maintains a constant temperature in the selected condensing zone.

Nevertheless, in commercial practice, the ordinary method of selecting a condensed fraction from a fractionating condenser consists in the use of temperature regulating devices intended to constantly maintain a predetermined temperature in the condensing zone. Such devices are more or less satisfactory when the object is to obtain a fraction having predetermined boiling points, but for reasons given above, a constant temperature in the condensing zone will result in variations in the boiling points. The same devices are commonly employed to maintain a constant condensing temperature when the object is to obtain a product having a predetermined gravity. It will be apparent, however, that the boiling points, or condensing points, are not a true guide to the gravity of the product, and that the inevitable variations in the operating conditions are additional factors tending to vary the gravity of a product condensed at a predetermined constant temperature.

To obtain a condensed product having a predetermined gravity, we depart from the usual idea of maintaining a constant or uniform condensing temperature. Instead of adhering to this rule, we deliberately vary the condensing temperatures, and thereby compensate for, or overcome, the effects of the usual variations due to inevitable changes in the operating conditions. Regardless of such inevitable changes, we constantly select and discharge a stream of condensate having the predetermined gravity.

With the foregoing and other objects in view, the invention comprises the novel method, construction, combination and arrangement of parts hereinafter more specifically described and shown in the accompanying drawings, which illustrate one form of the invention. However, it is to be understood that the invention comprehends changes, variations and modifications within the scope of the claims hereunto appended.

Briefly stated, the vapors in the fractionating condenser are subjected to variable cooling so as to condense selected portions of the vapors, and a stream of the resultant condensate is transmitted to a gravity-responsive device movable in response to variations in the gravity of the stream. Movement is transmitted from this gravity-responsive device to the variable cooling device, so as to regulate the cooling in accordance with the gravity of the condensate. Instead of maintaining a constant, or uniform, condensing temperature, the cooling device is regulated to deliberately change this temperature, and as a consequence, the condensed product has a predetermined gravity. The temperature changes in the condenser compensate for the above-mentioned inevitable variations in the operating conditions, and such changes in the condensing temperature will occur whenever the stream of condensate departs from the predetermined gravity, thereby adjusting the cooling device to maintain said gravity, regardless of other variations in the system.

Fig. 1 is a diagrammatical illustration of an apparatus embodying features of this invention.

Fig. 2 is an enlarged section showing a gravity-responsive device, and a regulating valve associated therewith.

To illustrate one form of the invention, we have shown a reflux fractionating condenser 3 provided with a vapor inlet 4 near the bottom and a vapor outlet 5 at the top. It will be understood that the vapors entering at 4 may be generated in any suitable manner, and the vapors discharged through the outlet 5 may be condensed in any desired condenser. The fractionating condenser 3 may be of the bubbling type, including a series of bubble decks 6 arranged to form a series of pools through which the vapors are bubbled and subjected to partial condensation as they progress through the condenser.

The rate and degree of cooling and condensing may be controlled in any suitable manner. For example, a cooling liquid may be admitted through a pipe 7, and the flow through this pipe may be regulated, or any other suitable means may be employed to regulate the cooling in the fractionating condenser. However, the regulating means is adjusted in accordance with the gravity of the condensate, thereby varying the temperatures in the selected condensing zone, instead of maintaining a uniform temperature condition.

Fig. 1 illustrates a condensing zone at the upper portion of the tower provided with a discharge pipe 8 through which the selected condensate is discharged to a receiver 9. A vent pipe 10 leads from the top of this receiver to the condenser 3 so as to equalize the pressure. The condensate is discharged from the receiver 9 through a conductor 11 leading to a pump 12, and if desired, this conductor 11 may be provided with a cooling device in the form of a heat exchanger 13 provided with a suitable valve 14 to regulate the cooling. The pump 12 forces the condensate through a discharge pipe 15 leading to storage. A back pressure regulator 16 may be located in the discharge pipe 15, as shown in Fig. 1. A portion of the condensate is returned through the pipe 7 branching from said discharge pipe 15 and equipped with air-actuated valve 17 to regulate the return flow. An air pipe 18 connects said valve 17 to a housing 19 containing a slidable valve 20, and having an inlet pipe 21 for compressed air, and a pipe 22 through which the air is exhausted. The slidable valve 20 comprises a pair of valve members 23 and 24 arranged as shown in Fig. 2 to control the air pressure in the pipe 18 leading to the valve 17. It will be understood that a device of this kind may be employed to regulate the valve 17 in the return pipe 7, thereby regulating the cooling in the selected zone of the fractionating condenser.

To illustrate a suitable means for adjusting the air-regulating valve 20 we have shown a gravity-responsive device including a float 25 and means for transmitting movement from said float to the valve 20. This operating means may include an arm 26 connected to the valve 20, said arm being fixed to a shaft 27 provided with an operating arm 28 which is connected to the float 25, as shown in Fig. 2. The float 25 is arranged in a chamber 29 having an inlet pipe 30 at the top connected to the pipe 15, and an outlet pipe 31 at the bottom also connected to said pipe 15. An orifice plate 32 is located in the pipe 15 at a point between the pipes 30 and 31, so as to cause a pressure differential at opposite sides of said plate. As a consequence, a continuous sample of the condensate flows through the pipe 30 and thence through the float chamber 29 to the pipe 31 through which it is returned to the discharge pipe 15.

It will now be understood that a continuous stream of condensate is discharged from the fractionating condenser, and that a sample of this condensate is constantly transmitted through the float chamber 29. The float 25 in said chamber may be regarded as a feeler in constant contact with the flowing sample, so as to rise and fall in response to variations in the gravity, or density, of the condensate. Since the movements of the float are transmitted to the regulating valve 20, the flow of cooling fluid through the pipe 7 is varied in accordance with variations in the gravity of the condensate. The float 25 is adjusted for a predetermined gravity, and any departure from that gravity will immediately result in an adjustment of the valve 20 which regulates the cooling in the condenser. A condensed fraction having a predetermined gravity is thus selected from the condenser, regardless of the inevitable usual variations which occur when the condenser is in service.

It will be observed that the selected condensate is constantly undergoing the test of this gravity-responsive testing device, and that energy is constantly transmitted from said testing device to the regulating means, so as to either maintain the air valve 20 in a fixed position, or to immediately shift said valve when there is a slight departure from the predetermined gravity.

The continuous stream of condensate discharged from the condenser may be cooled at any desired point. When the cooling occurs before the stream reaches the sampling device, it may be convenient to cool all of the stream to an approximately constant temperature, so that the gravity will be ascertained at that temperature. For example, the valve 14 at the heat exchanger 13 may be regulated to maintain the stream of condensate at a predetermined temperature, or the sample of condensate in the chamber 29 may be otherwise maintained at an approximately uniform temperature. However, other suitable means may be employed to compensate for variations in the temperature of the condensate discharged from the fractionating condenser.

The gravity-responsive device herein shown includes a second float chamber 33 located within the chamber 29, and containing a body of mercury or other relatively heavy liquid. A temperature-compensating float 34 is submerged in the mercury and provided with a stem 35 connected to a bar 36. Vertical rods 37 connect said bar to the float 25. The two floats are thus connected together. The density of the float 25 is greater than the density of the condensate in which it is submerged, but the density of the float 34 is less than that of the mercury, or other heavy liquid in which it it submerged. The resultant upward and downward forces tend to counterbalance each other at the selected predetermined gravity, so a slight change in the gravity of the condensate will unbalance the opposing forces and cause the float assembly to move upwardly or downwardly, thereby transmitting movement to the air valve 20 which regulates the delivery of cooling fluid to the fractionating condenser.

The mercury in the inner float chamber 33 is subjected to variations in the temperature of the stream of condensate, and this mercury is free to expand and contract in response to the changes in temperature. The surface of the mercury will rise and fall during these temperature changes, and tend to impart corresponding movements to the float 34. Bearing in mind that the object is to maintain the condensate at a predetermined gravity, it will be observed that a change in temperature will affect the density of the condensate, and that the float 25 submerged in the condensate will, therefore, tend to move in response to changes in the temperature of said condensate.

However, such temperature changes are compensated for by the expansion and contraction of the mercury in which the float 34 is submerged. A rise in temperature will tend to elevate the float 34, and at the same time increase the downward force of the float 25. The opposing forces are thus balanced to prevent material displacement of the float assembly in response to changes in the temperature of the condensate. In other words, the object is to select a condensed fraction having a predetermined gravity at, for example, 60° F., and this can be accomplished irrespective of the temperature of the selected stream of condensate.

The mercury chamber 33 may be open at the top, and its diameter at the surface of the mercury may be varied to obtain the desired rise and fall of said surface in response to the temperature variations. Another adjustment can be obtained by varying the diameter of the stem 35 on the float 34. Such variations in the design enable the device to meet radically different operating conditions, and at the same time provide for the selection of a fraction having any desired gravity.

We claim:

1. In the art of selecting predetermined fractions from fractionating condensers, the method of selecting a fraction having a predetermined gravity which comprises subjecting the vapors in the condenser to variable cooling so as to condense selected portions of the vapors, discharging a continuous stream of the resultant condensate from the condenser, constantly testing said continuous stream to ascertain the gravity thereof while it is flowing from the condenser, and transmitting energy from the testing means to the variable cooling means, so as to regulate the cooling in accordance with the gravity of said continuous stream.

2. In the art of selecting predetermined fractions from fractionating condensers, the method of selecting a fraction having a predetermined gravity which comprises subjecting the vapors in the condenser to variable cooling so as to condense selected portions of said vapors, discharging a continuous stream of the resultant condensate from the condenser, cooling said stream to an approximately uniform predetermined temperature, constantly testing said cooled continuous stream to ascertain the gravity thereof while it is flowing from the condenser, and transmitting energy from the testing means to the variable cooling means, so as to regulate the cooling of the vapors in accordance with the gravity of said continuous stream.

3. In the art of selecting predetermined fractions from fractionating condensers, the method of selecting a fraction having a predetermined gravity which comprises subjecting the vapors in the condenser to variable cooling so as to condense selected portions of said vapors, transmitting a continuous stream of the resultant condensate to a gravity-responsive member movable in response to variations in the gravity of the continuous stream, and transmitting energy from said gravity-responsive member to the variable cooling device, so as to regulate the cooling in accordance with the gravity of said continuous stream.

4. In the art of selecting predetermined fractions from fractionating condensers, the method of selecting a fraction having a predetermined gravity which comprises subjecting the vapors in the condenser to variable cooling so as to condense selected portions of the vapors, transmitting a continuous stream of the resultant condensate through a chamber containing a submerged float movable in response to variations in the gravity of the continuous stream, maintaining a body of relatively heavy liquid in a second chamber containing a submerged float, said floats being counterbalanced when the gravity of said continuous stream conforms to the selected predetermined gravity, and constantly transmitting energy from said floats to the variable cooling device so as to regulate said cooling in accordance with the gravity of the stream flowing through the first mentioned chamber.

5. In an apparatus for selecting predetermined fractions from a fractionating condenser provided with means for regulating the cooling in the condenser, a sampler for the condensed fraction to be discharged from said condenser, said sampler including a member movable in response to variations in the gravity of said condensed fraction, and means for transmitting movement from said movable member to said regulating means, so as to adjust said regulating means in accordance with said variations in gravity.

6. In an apparatus for selecting predetermined fractions from a fractionating condenser provided with means for regulating the cooling in the condenser, a testing device including a chamber through which a portion of the condensate is transmitted, and a testing member submerged in said chamber, said testing member being movable in response to variations in the gravity of the condensate in said chamber, and means for transmitting movement from said testing member to said regulating means, so as to regulate said cooling in accordance with the gravity of the condensate in said chamber.

7. In an apparatus for selecting predetermined fractions from a fractionating condenser provided with means for regulating the cooling in the condenser, a chamber through which a stream of the condensate is transmitted, a float in said chamber movable in response to variations in the gravity of said stream, and means for transmitting movement from said float to said regulating means, so as to regulate said cooling in accordance with the gravity of said stream.

8. In an apparatus for selecting predetermined fractions from a fractionating condenser provided with means for regulating the cooling in the condenser, a chamber through which a stream of the condensate is transmitted, a float in said chamber movable in response to variations in the gravity of said stream, a temperature-compensating device cooperating with said float to adjust the float for the gravity at a predetermined temperature, said temperature-compensating device including a variable heat-exchanger adjusted to maintain the condensate in said chamber at an approximately uniform temperature, and means for transmitting movement from said float to said regulating means, so as to regulate said cooling in accordance with the gravity of said stream.

9. In an apparatus for determining the gravity of fractions discharged from a fractionating condenser irrespective of the temperature of the discharged condensate, means for regulating the cooling in said fractionating condenser, a chamber through which a selected stream of the condensate is discharged, a variable heat-exchanger adjusted to maintain the contents of said chamber at an approximately uniform temperature, a gravity-responsive feeler contacting with the condensate in said chamber and movable in response to variations in the gravity of said condensate, and means for transmitting movement from said feeler to said regulating means, so as to regulate said cooling in accordance with the gravity of said stream.

10. In an apparatus for selecting predetermined fractions from a fractionating condenser provided with means for regulating the cooling in the condenser, a chamber through which a stream of the condensate is transmitted, a gravity-responsive feeler contacting with the condensate in said chamber and movable in response to variations in the gravity of said condensate, a temperature-compensating member cooperating with said feeler to adjust the feeler in accordance with variations in the temperature of said condensate, and means for transmitting movement from said feeler to said regulating means, so as to regulate said cooling in accordance with the gravity of said stream.

11. In an apparatus for selecting predetermined fractions from a fractionating condenser provided with means for regulating the cooling in the condenser, a chamber through which a continuous stream of the condensate is transmitted, a gravity-responsive feeler contacting with the condensate in said chamber and movable in response to variations in the gravity of said condensate, a temperature-compensating member subjected to the temperature of said stream of condensate and movable in response to variations in the temperature of said condensate, and means for transmitting movement from said feeler and temperature-compensating member to said regulating means, so as to regulate said cooling in accordance with the gravity of said stream.

12. In an apparatus for selecting predetermined fractions from a fractionating condenser provided with means for regulating the cooling in the condenser, a chamber through which a stream of the condensate is transmitted, a float in said chamber movable in response to variations in the gravity of said stream, a temperature-compensating device cooperating with said float to adjust the float for the gravity at a predetermined temperature, and means for transmitting movement from said float to said regulating means, so as to regulate said cooling in accordance with the gravity of said stream.

13. In an apparatus for selecting predetermined fractions from a fractionating condenser provided with means for regulating the cooling in the condenser, a chamber through which a continuous stream of the condensate is transmitted, a float in said chamber movable in response to variations in the gravity of said continuous stream, a temperature-compensating device cooperating with said float to adjust the float for the gravity at a predetermined temperature, said temperature compensating device including an adjusting member subjected to the temperature of said stream of condensate and connected to said float, and means for transmitting movement from said adjusted float to said regulating means, so as to regulate said cooling in accordance with the gravity of said stream.

14. In an apparatus for determining the gravity of fractions discharged from a fractionating condenser irrespective of the temperature of the discharged condensate, means for regulating the cooling in said fractionating condenser, a chamber through which a selected stream of the condensate is discharged, a variable heat-exchanger adjusted to maintain the contents of said chamber at an approximately uniform temperature, a gravity-responsive feeler contacting with the condensate in said chamber and movable in response to variations in the gravity of said condensate, a temperature-compensating member cooperating with said feeler to adjust the feeler in accordance with variations in said approximately uniform temperature, said compensating member being in heat-exchanging relationship with said stream of condensate, and means for transmitting movement from said feeler to said regulating means, so as to regulate said cooling in accordance with the gravity of said stream.

15. In an apparatus for determining the gravity of fractions discharged from a fractionating condenser irrespective of the temperature of the discharged condensate, means for regulating the cooling in said fractionating condenser, a chamber through which a selected stream of the condensate is discharged, a gravity-responsive float suspended in the condensate in said chamber and movable in response to variations in the gravity of said condensate, the density of said float being greater than the density of said condensate, a second chamber containing a body of mercury arranged in the course of said condensate and subjected to variations in the temperature of the condensate, a temperature-compensating float suspended in said mercury, the density of said temperature-compensating float being less than that of the mercury, connecting means uniting said floats to adjust said gravity-responsive float in accordance with the temperatures of said mercury, said floats being balanced at the selected predetermined gravity, and means for transmitting movement from the connected floats to said regulating means, so as to regulate said cooling in accordance with the gravity of said selected stream of condensate.

GLENN E. WYNN.
ROBERT G. HUGGINS.